(12) United States Patent
Hampo et al.

(10) Patent No.: US 6,394,208 B1
(45) Date of Patent: May 28, 2002

(54) STARTER/ALTERNATOR CONTROL STRATEGY TO ENHANCE DRIVEABILITY OF A LOW STORAGE REQUIREMENT HYBRID ELECTRIC VEHICLE

(75) Inventors: Richard Joseph Hampo, Livonia; Xingyi Xu, Canton, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/539,512

(22) Filed: Mar. 30, 2000

(51) Int. Cl.[7] ............................. B60K 1/00; B60K 6/00
(52) U.S. Cl. ...................... 180/65.2; 180/65.3; 318/139
(58) Field of Search .......................... 180/65.2, 65.3, 180/65.4, 65.6, 65.7, 69.6, 65.8; 318/139, 376, 377; 123/339.11, 339.16

(56) References Cited

U.S. PATENT DOCUMENTS

| 4,335,429 A | | 6/1982 | Kawakatsu | |
|---|---|---|---|---|
| 4,922,869 A | | 5/1990 | Kadomukai et al. | |
| 5,176,213 A | | 1/1993 | Kawai et al. | |
| 5,327,992 A | | 7/1994 | Boll | |
| 5,656,921 A | | 8/1997 | Farrall | |
| 5,722,911 A | * | 3/1998 | Ibaraki et al. | 180/65.3 |
| 5,778,326 A | * | 7/1998 | Moroto et al. | 180/65.2 |
| 5,789,882 A | * | 8/1998 | Ibaraki et al. | 180/65.3 |
| 5,823,282 A | * | 10/1998 | Yamaguchi et al. | 180/65.2 |
| 5,833,570 A | | 11/1998 | Tabata et al. | |
| 5,839,533 A | | 11/1998 | Mikami et al. | |
| 5,865,263 A | * | 2/1999 | Yamaguchi et al. | 180/65.2 |
| 6,054,844 A | * | 4/2000 | Frank | 180/65.2 |
| 6,124,690 A | * | 9/2000 | Yano et al. | 180/65.2 |
| 6,135,914 A | * | 10/2000 | Yamaguchi et al. | 180/65.2 |
| 6,140,780 A | * | 10/2000 | Oshima et al. | 180/65.2 |
| 6,209,517 B1 | * | 4/2001 | Yasui | 123/339.11 |

* cited by examiner

Primary Examiner—Lanna Mai
Assistant Examiner—Hau Phan
(74) Attorney, Agent, or Firm—Carlos L. Hanze

(57) ABSTRACT

A hybrid electric vehicle contains a powerplant for propelling the vehicle. The powerplant comprises a combustion engine (6) and a dynamoelectric machine (8). A control system (10) issues a wheel torque command corresponding to torque desired at road-engaging wheels, and includes an engine controller (16) for issuing an engine torque command and a dynamoelectric machine controller (18) for issuing a dynamoelectric machine torque command. Controller (18) contains one or more maps and/or profiles defining functional relationship of torque to engine crankshaft speed and/or position over a range of crankshaft speeds and/or positions. The maps and/or profiles are used to develop make-up torque that is delivered by the dynamoelectric machine to accomplish certain smoothing functions. Transmission gear shifts can be smoothed by using the dynamoelectric machine controller to slew the engine to a new target speed appropriate to the new gear. A dedicated, high-speed data communication link supplies crankshaft speed and position information from an engine-mounted sensor directly to controller (18).

14 Claims, 2 Drawing Sheets

STARTER/ALTERNATOR CONTROL STRATEGY TO ENHANCE DRIVEABILITY OF A LOW STORAGE REQUIREMENT HYBRID ELECTRIC VEHICLE

BACKGROUND OF THE INVENTION

1. Field of the Invention

This invention relates generally to hybrid electric vehicles, and more particularly to a control strategy for a hybrid electric vehicle of the type in which a dynamoelectric machine, such as a combination starter/alternator, interacts with a combustion engine that drives road-engaging wheels through a drivetrain.

2. Background Information

In one type of hybrid electric vehicle (HEV) a combustion engine is coupled through a drivetrain to road-engaging wheels, and a dynamoelectric machine, such as a combination starter/alternator, can interact with the engine either to add to or to subtract from the torque output of the engine into the drivetrain. Such a starter/alternator may be structurally integrated with a combustion engine.

At some times, the dynamoelectric machine may develop torque that is additive to the engine torque, thereby augmenting the torque from the engine into the drivetrain, while at others, it may instead impose a torque load on the engine, diminishing the magnitude of torque that can be delivered by the engine into the drivetrain. In other words, when it is adding to the engine torque into the drivetrain, the dynamoelectric machine functions as an electric motor, and when it is subtracting from the engine torque into the drivetrain, it functions as an alternator, or electric generator, that is being driven by the engine.

When functioning as an alternator powered by the engine, the rotating electric machine generates electricity that can be used for any appropriate purpose, such as charging an on-board storage battery, or batteries. When functioning as a motor, the rotating electric machine may draw electric current from the storage battery, or batteries, to supplement the power output of the engine to the drivetrain.

In order to conserve energy during times when it is idling, the engine may instead be shut down temporarily until it is once again called on to deliver torque to the drivetrain. Because of its association with the combustion engine, the electric machine may be used as a motor, drawing power from the on-board battery, or batteries, to re-start the engine.

From the foregoing brief and somewhat general description, it can be understood that various possible modes in which a rotating electric machine can interact with a combustion engine require a sophisticated control system and control strategy. The availability of high-speed electronic devices, such as processors, enables sophisticated control strategies to be implemented in real time. For example, a basic control system may comprise a processor-based starter/alternator (S/A) controller and a processor-based engine controller. For control of certain interactions between the starter/alternator and the engine toward achieving a desired operational result, it may be necessary for required data to be transmitted between sensors and controllers and/or between controllers in real time. Such a data transfer requirement may overload an existing data communication link, and therefore in order to accommodate the data transfer requirement, the data communication link may have to be expanded, making implementation of the desired control strategy either very expensive or simply impossible. It would therefore be beneficial if a desired control strategy that would avoid both of those alternatives could be realized.

U.S. Pat. Nos. 4,335,429; 4,922,869; 5,176,213; 5,327,992; 5,656,921; 5,833,570 and 5,839,533 were developed in consequence of a novelty search with respect to the present invention, and they are believed representative of the state of the art. They disclose various forms of HEV's and control systems. Certain control systems shown in those patents contain maps for use in various control strategies.

SUMMARY OF THE INVENTION

The present invention relates to improvements in HEV control strategy implementation, particularly in an HEV of the type discussed above where a dynamoelectric machine is arranged for interaction with a combustion engine so as to function, with respect to the engine, at times as a power source, i.e. as an electric motor, for adding torque into the drivetrain, and at times as a power sink, i.e. as an alternator, for replenishing the charge of an on-board storage battery. This type of HEV is representative of what is sometimes referred to as a low storage requirement HEV.

For achieving a desired operational result by real-time control of interaction between a dynamoelectric machine and a combustion engine in an HEV, the invention provides an alternative solution to one that merely expands an existing data communication link in order to accommodate real time transfer of data required for implementation of a desired control strategy that is needed in order to achieve the desired operational result. The solution provided by the present invention is believed preferable because it may avoid the added cost which might be imposed on an HEV by expanding an existing data communication link for the sole purpose of implementing a particular desired control strategy.

Briefly, one aspect of the present invention relates to a control strategy where certain aspects of engine operation are mapped, the maps are stored in a controller for the dynamoelectric machine, i.e. an S/A controller, and the stored maps are utilized by the S/A controller during HEV operation to cause the starter/alternator to quickly respond to changing variables so that a desired operational result is achieved without having to rely on the engine controller or the vehicle system controller.

More especially, one general aspect of the invention relates to a hybrid electric vehicle comprising: a powerplant for propelling the vehicle comprising a combustion engine and a dynamoelectric machine; a control system comprising a vehicle controller that receives driver input and issues respective outputs to an engine controller for controlling the engine and to a dynamoelectric machine controller for controlling the dynamoelectric machine, respectively; a signal source on the engine providing engine speed data to said dynamoelectric machine controller; the dynamoelectric machine controller comprising a look-up table that contains respective make-up torque values correlated with respective values of engine speed data; and the dynamoelectric machine controller comprising a processor that causes a make-up torque value from the look-up table corresponding to a value of engine speed data received from the signal source, to be included in the torque output of the dynamoelectric machine.

Another general aspect relates to a hybrid electric vehicle comprising: a powerplant for propelling the vehicle comprising a combustion engine having a crankshaft and a dynamoelectric machine; a control system comprising a vehicle controller that receives driver inputs and issues respective outputs to an engine controller for controlling the engine and to a dynamoelectric machine controller for controlling the dynamoelectric machine, respectively; a signal source on the engine providing engine crankshaft position information to said dynamoelectric machine controller; the dynamoelectric machine controller comprising a stored make-up torque profile correlated with crankshaft position for attenuating pulsations in engine torque output induced by changing pressures in combustion cylinders of the engine as the engine crankshaft rotates; and the dynamoelectric machine controller comprising a processor that causes make-up torque corresponding to the stored profile to be included in the torque output of the dynamoelectric machine in attenuating relationship to pulsations in engine torque output induced by the changing pressures in the combustion cylinders of the engine as the engine crankshaft rotates.

Another general aspect relates to a hybrid electric vehicle comprising: a powerplant for propelling the vehicle comprising a combustion engine and a dynamoelectric machine; a control system comprising a vehicle controller that receives driver input and issues respective outputs to an engine controller for controlling the engine and to a dynamoelectric machine controller for controlling the dynamoelectric machine, respectively; a signal source on the engine providing data related to crankshaft motion, said data provided to said dynamoelectric machine controller; a data communication link from the signal source to the dynamoelectric machine controller via which the crankshaft motion data is communicated to the dynamoelectric machine controller; the dynamoelectric machine controller comprising at least one look-up table for developing a respective makeup torque value correlated with the crankshaft motion data and data for at least one other variable related to vehicle operation; and the dynamoelectric machine controller comprising a processor that causes a make-up torque value from the at least one look-up table to be included in the torque output of the dynamoelectric machine in accordance with the crankshaft motion data and the at least one other variable data.

Still another general aspect relates to a method of operating a hybrid electric vehicle of the type comprising a powerplant for propelling the vehicle comprising a combustion engine having a crankshaft and a dynamoelectric machine; a control system comprising a vehicle controller that receives driver inputs and issues respective outputs to an engine controller for controlling the engine and to a dynamoelectric machine controller for controlling the dynamoelectric machine, respectively; the method comprising: supplying engine speed data from a signal source on the engine to the dynamoelectric machine controller; operating a processor of the dynamoelectric machine controller to look up make-up torque values that are stored in the dynamoelectric machine controller in correlation with respective values of engine speed data; and outputting from the processor make-up torque signals correlated to values of supplied engine speed data to create make-up current in the dynamoelectric machine that contributes to the torque output of the dynamoelectric machine in an amount corresponding to looked-up make-up torque.

Further aspects will be seen in the ensuing description, claims, and accompanying drawings.

BRIEF DESCRIPTION OF THE DRAWINGS

The drawings that will now be briefly described are incorporated herein to illustrate a preferred embodiment of the invention and a best mode presently contemplated for carrying out the invention.

DESCRIPTION OF THE PREFERRED EMBODIMENT(S)

Figure 1:
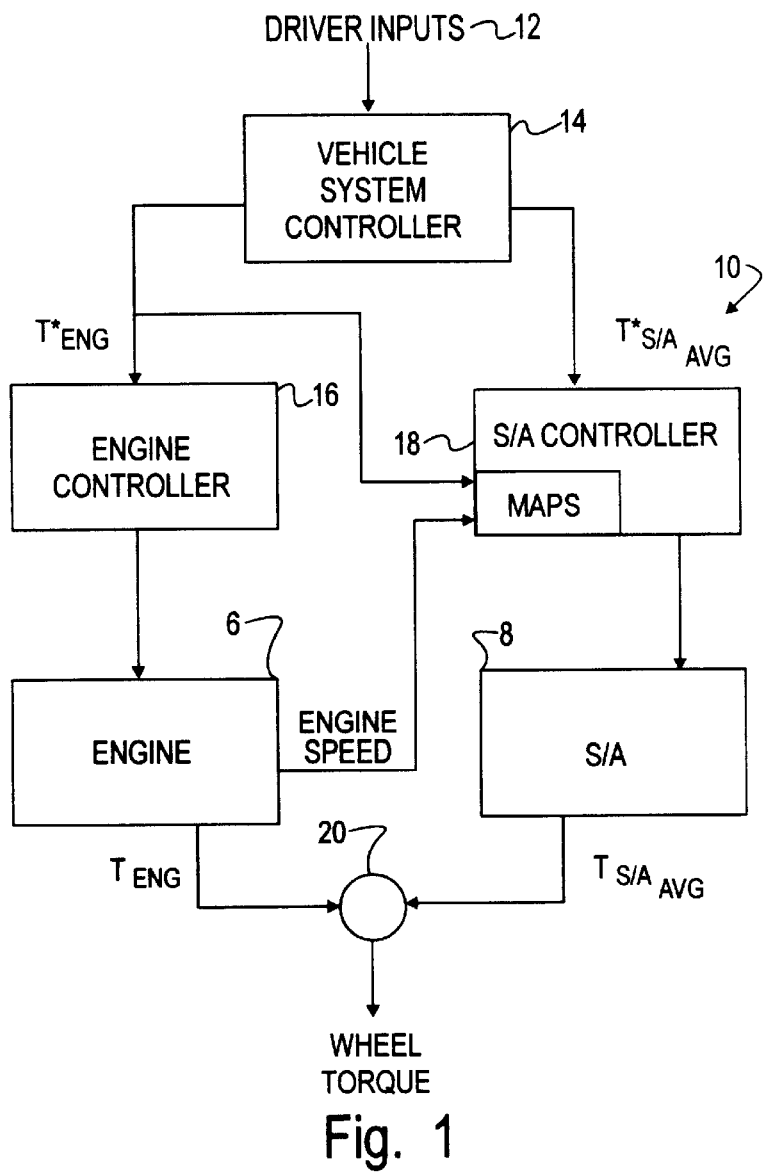
FIG. 1 is a schematic block diagram of an example of an HEV control system implementing a control strategy pursuant to principles of the present invention.

FIG. 1 shows a control system 10 of an HEV of the type having a combustion engine 6 coupled through a drivetrain to road-engaging wheels, and a dynamoelectric machine 8, such as a combination starter/alternator, associated with the engine. Collectively, the combustion engine and the dynamoelectric machine form the HEV powerplant that propels the HEV, delivering torque via the drivetrain to the road-engaging wheels. When the dynamoelectric machine is contributing torque to the powerplant, it draws electric current from an on-board storage battery, or batteries.

Control system 10 utilizes known processors that process information from various sources and provide various outputs for accomplishing a desired overall control strategy. The processors communicate via a known data communication link that has moderate bandwidth. Certain information that requires processing is provided by sources which are on line with the data link in the HEV, various sensors for example, and that information is made available on the data link in suitable form and at suitable times using known protocols, thereby making the data available for use as required by the processors. The on-line information also includes driver inputs, designated in FIG. 1 by the general reference numeral 12, and such driver inputs may include, but are not necessarily limited to, acceleration and braking of the HEV.

The illustrated embodiment of control system 10 comprises three controllers. A first is a vehicle system controller 14, a second is an engine controller 16, and a third is a starter/alternator (S/A) controller 18. Each controller may comprise its own dedicated processor. Data communication among the processors, the various input devices, and the various output devices takes place via the data communication link.

Control system 10 implements a comprehensive control strategy in the following manner. Engine controller 16 controls the combustion process of engine 6 such that mean torque produced by the engine tracks whatever engine torque is being commanded by engine controller 16. S/A controller 18 controls the torque produced by starter/alternator 8. Vehicle system controller 14 coordinates the two subsystems, i.e. the engine sub-system and the starter/alternator subsystem. Vehicle system controller 14 utilizes driver inputs to generate commands for the two subsystems; it may also communicate with a transmission controller (not shown in FIG. 1) to ensure proper and smooth transmission gear shifting.

Because certain data communications between processors, certain input devices, and certain output devices do not require wide bandwidth, a cost-efficient communication medium for the data link is sufficient to handle most data. communication needs. A CAN network with moderate bandwidth is an example of a suitable data communication link. On the other hand, data communication needs for implementing certain aspects of the inventive principles cannot be adequately served by a moderate bandwidth data link. Therefore, rather than burdening an entire network with a more costly, wider bandwidth capability, the disclosed implementation of the invention includes a dedicated, high-speed data communication link between engine 6 and starter/alternator 8, specifically between a crankshaft position/speed sensor of engine 6 and S/A controller 18. With such a data link, torque smoothing and engine slewing functions that will be described in more detail later, can be controlled by S/A controller 18, instead of vehicle system controller 14, which perhaps would have seemed a logical choice so far as the control hierarchy is concerned.

FIG. 1 shows vehicle system controller 14 performing various functions associated with operation of the HEV, including the functions of determining a mean (average) engine torque command $T^*_{eng}$, and of determining a starter/alternator (S/A) torque command $T^*_{S/A}$. The mean engine torque command $T^*_{eng}$ is a result of computation performed by the processor of vehicle system controller 14, and represents a desired average torque, as distinguished from instantaneous torque, that engine 6 should produce. The signal $T^*_{eng}$ is published on the data communication link for use by engine controller 16, which processes the signal so as to cause engine 6 to develop mean torque output $T_{eng}$ which tracks the desired average engine torque being commanded.

The S/A torque command signal $T^*_{S/A}$ represents torque that starter/alternator 8 should produce. The signal may result from computation performed by the processor of vehicle system controller 14 using certain inputs. Like the engine torque command, the S/A torque command $T^*_{S/A}$ is also published on the data communication link. In the absence of make-up torque, which will be described later in its various aspects and which is additional to whatever torque $T^*_{S/A}$ is being commanded by vehicle system controller 14, S/A controller 18 processes the S/A torque command $T^*_{S/A}$ to cause starter/alternator 8 to develop a torque output $T_{S/A}$, which corresponds substantially to the torque output command signal $T_{S/A}$. Except when it is not running under its own power, and is therefore acting like a brake that imposes a friction torque load on the powerplant (i.e. negative torque), a combustion engine running under its own power develops positive torque at its output shaft; starter/alternator 8, like engine 6, develops positive torque output when acting as an electric motor, but the starter/alternator can also develop negative torque when acting as an alternator, or electric generator. The actual torque output of the HEV powerplant corresponds to the algebraic summation of the outputs $T_{eng}$ and $T_{S/A}$ as shown schematically at the summing junction 20 in FIG. 1. The powerplant torque output is reflected as propulsion, or traction, torque delivered to the driven, road-engaging wheels of the HEV.

The HEV may be capable of different modes of utilizing its powerplant, but whether any particular HEV is capable of utilizing all such modes, or less than all such modes, will depend on its particular design. In one mode, the propulsion torque may be produced solely by engine torque; in another mode, the propulsion torque may be produced solely by starter/alternator torque, assuming the dynamoelectric machine has sufficient power to do so; and in still another, the propulsion torque may be produced by a combination of engine torque and starter/alternator torque. As will be more fully explained hereinafter, certain principles of the present invention involve interactions between the engine and the starter/alternator.

There are four possibilities for vehicle system controller 14 to issue torque commands. At any given instant of time, controller 14 may be issuing: one, neither an engine torque command $T^*_{eng}$ nor an S/A torque command $T^*_{S/A}$; two, only an S/A torque command $T^*_{S/A}$; three, only an engine torque command $T^*_{eng}$; and four, both an engine torque command $T^*_{eng}$ and an S/A torque command $T^*_{S/A}$. The first possibility occurs when the HEV is not being propelled; the second, when the engine is being started, or re-started; the third, when the engine is running; and the fourth, when the starter/alternator is interacting with the running engine.

Figure 2:
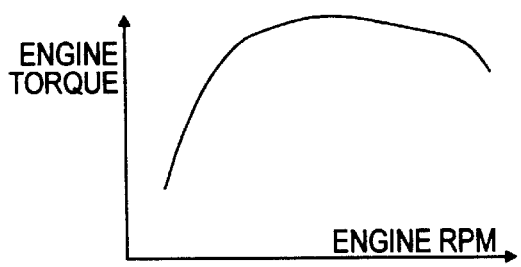
FIG. 2 is a first representative graph plot defining a functional relationship useful in practicing certain principles of the invention.
Figure 3:
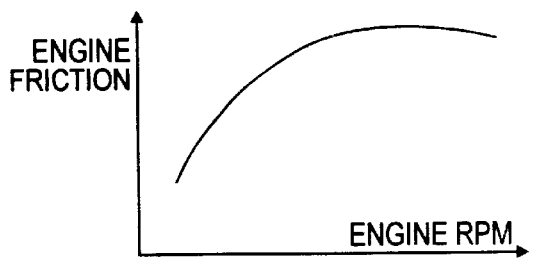
FIG. 3 is a second representative graph plot defining another functional relationship useful in practicing certain principles of the invention.

In accordance with certain principles of the invention, S/A controller 18 contains certain stored maps. They are used in development of make-up torque that was mentioned earlier. The maps are stored in electronic digital form in memory of S/A controller 18. The basis of one example of a map is graphically portrayed in FIG. 2, and that of another, in FIG. 3. FIG. 2 shows a two-dimensional graph plot, defining a torque versus speed characteristic of combustion engine 6. The graph plot of FIG. 3 is also two-dimensional, defining a friction torque versus speed characteristic of the engine. Data for developing the maps may be derived from actual testing of engine 6, such as on an engine dynamometer, and/or testing of one or more other engines like the HEV engine. Because engine friction is also a function of temperature, the map derived from FIG. 3 may alternatively be a three-dimensional one, instead of a two-dimensional one, the third dimension being engine temperature.

The stored maps are embodied in S/A controller 18 as electronic look-up tables that are utilized in conjunction with certain inputs, including engine speed data, to control the traction torque in desired ways in relation to changing driver inputs and changing engine speed, particularly causing starter/alternator 18 to act so as to minimize undesired influences of changing engine torque on vehicle traction torque. It is believed that such action can improve the quality of vehicle operation that a driver of the vehicle experiences during certain driving situations. One improvement that may be perceived is smoother quality of vehicle accelerations when the driver is accelerating the vehicle by depressing the vehicle's accelerator pedal. Another is smoother decelerations when the driver is decelerating the vehicle by releasing the accelerator pedal and applying the vehicle's service brakes.

S/A controller 18 utilizes real-time engine crankshaft speed data that is being supplied via the dedicated, high-speed data link as input for the stored maps derived from the graph plots of FIGS. 2 and 3. For a respective value of engine speed, S/A controller 18 can look up a corresponding engine torque data value and a corresponding engine friction data value, respectively. However, S/A controller 18 may not necessarily use the looked-up data values on a continuous basis to constantly update control of starter/alternator 8. Rather, it may use the looked-up data to control starter/alternator 8 only during certain conditions, often transient in nature, such as certain driver-commanded accelerations and decelerations of the vehicle.

An example of use of the map derived from the graph plot of FIG. 2 is given by the following-description of a situation where only an engine torque command signal, and not a starter/alternator command signal, is being issued by vehicle system controller 14. Engine speed change resulting from that command signal will cause engine torque to change in relation to-engine speed as portrayed by FIG. 2. If no S/A torque command $T^*_{S/A}$ is being concurrently input to S/A controller 18, the latter controller will nevertheless cause starter/alternator 8 to develop some output torque $T_{S/A}$ based on engine speed and the map derived from the graph plot of FIG. 2. For each of various engine speeds within a range of engine speeds, the map defines a corresponding value of make-up torque which has been predetermined to be desirable to add to the engine torque output at that engine speed. Hence, the value of that make-up torque is read from the stored map in accordance with the real-time value of engine speed being supplied via the dedicated, high-speed data link. The stored map correlates make-up torque values with engine speed such that at each of respective engine speeds there is a corresponding make-up torque value which, if added to the mean engine torque being developed at the respective engine speed, will produce what may be perceived by a driver of the vehicle as better driveability during certain driving conditions, especially when vehicle speed is changing in consequence of driver input.

Such make-up torque can be either positive or negative, causing starter/alternator 8 to act either as a motor, or as an alternator. A map derived from the graph-plot of FIG. 2 may be used to add torque to the drivetrain to smooth out vehicle acceleration. In similar fashion, a map derived from the graph plot of FIG. 3 may be used during vehicle deceleration when engine 6 is shut off and functions like a brake.

Figure 4:
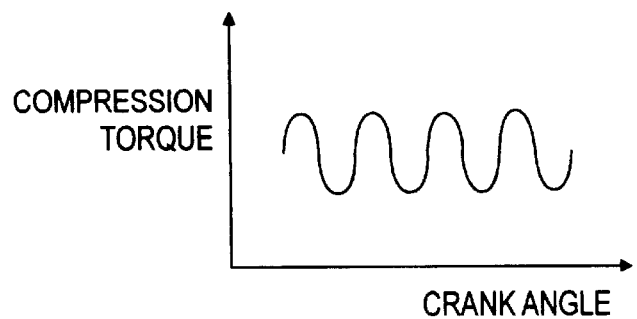
FIG. 4 is a third representative graph plot related to certain aspects of the invention.

FIG. 4 graphically portrays an example of another aspect of mapping for developing make-up torque. Because of the inherent nature of the piston-crankshaft mechanism of an internal combustion engine of that type, a graph plot of instantaneous engine torque output as a function of crankshaft position would show pulsations related to changing pressures in the engine cylinders. The pulsations are apt to be more pronounced in engines where combustion events are less frequent, four-cylinder engines for instance, than in others, such as eight-cylinder engines.

According to this further aspect of the invention, a dynamoelectric machine, like starter/alternator 8, can smooth out such pulsations because of its ability to produce a make-up torque signal $\Delta T_{S/A}$ sufficiently quickly in relation to the frequency at which engine torque pulses induced by changing cylinder pressures are occurring. However, in order to attain that capability, the control system must be able to process data sufficiently fast to make real time calculations that will produce an appropriate real-time make-up torque signal for the S/A machine that, when summed with the pulsating engine torque, will attenuate pulsations in the traction torque. To create make-up torque for compensating traction torque pulsations caused by changing engine cylinder pressures, a compression load profile of the engine is developed and stored electronically in memory of S/A controller 18. The stored profile is used to generate a make-up torque signal $\Delta T^*_{S/A}$ that bears a functional relationship to engine crankshaft rotational position.

Because of the ability of the dedicated high-speed data link between engine 6 and S/A controller 8 to supply a real-time signal of crankshaft rotational position, the processor of S/A controller 18 can develop the compensating signal $\Delta T_{S/A}$ in real time to counterbalance the pulsating component of the engine torque output.

Figure 5:
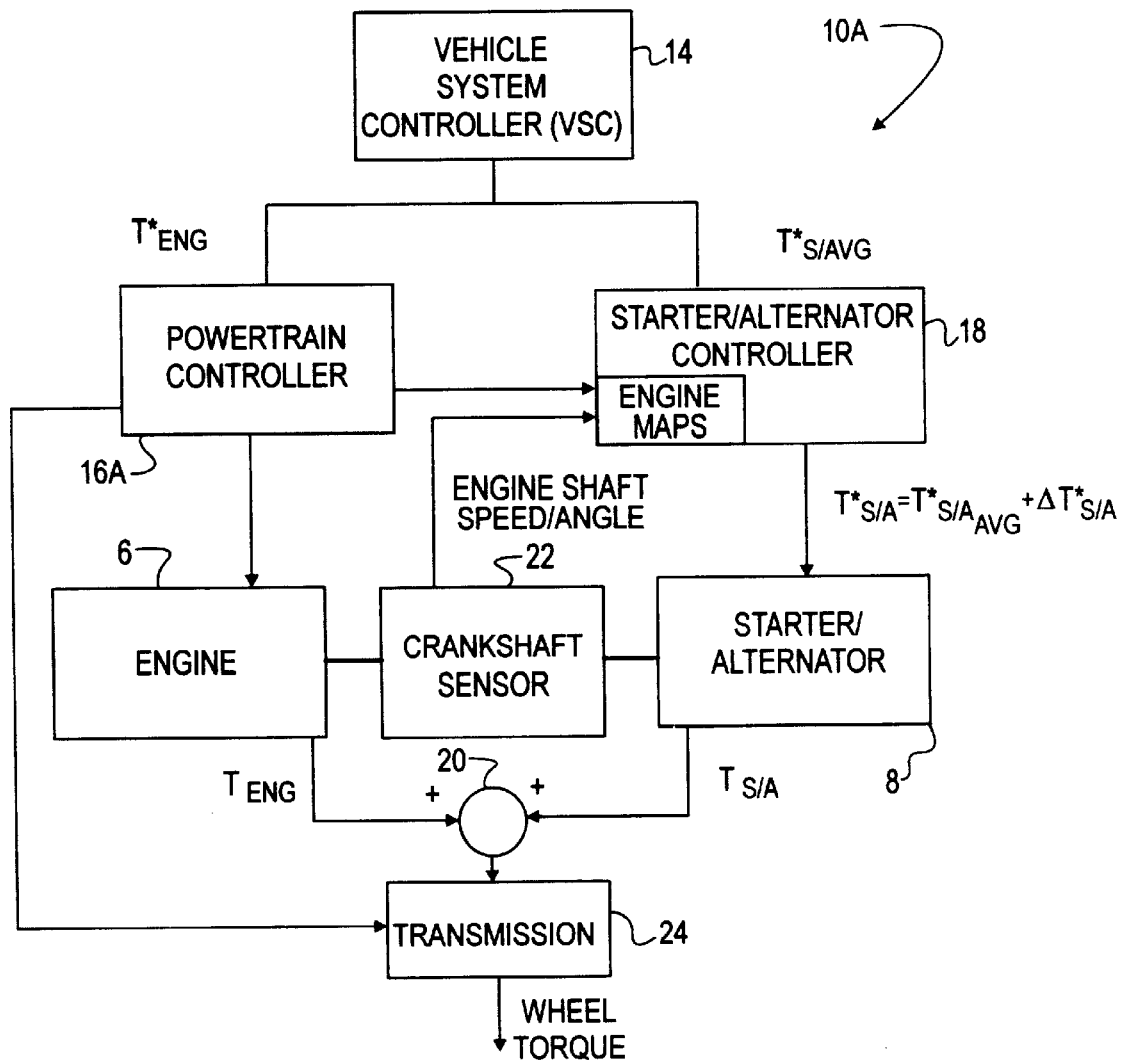
FIG. 5 is a schematic block diagram of a more comprehensive form of FIG. 1.

Another situation where a dynamoelectric machine such as starter/alternator 8 can contribute to perceptibly smoother HEV operation is during transmission gear shifts. FIG. 5 displays a control system 10A possessing that capability. Instead of having just an engine controller, system 10A has a powertrain controller 16A that controls both engine 6 and a multi-gear transmission 22 of the HEV. Engine speed and engine throttle position are used to establish transmission gear shift points for transmission 22. For initiating a transmission gear shift, vehicle controller 14 issues a command to powertrain controller 16A to reduce the engine torque output, a command to transmission 22 to disengage the drivetrain from the engine, and a command to S/A controller 18 to slew the engine to a new target speed. S/A controller 18 uses the real time engine speed data supplied via the dedicated, high-speed data link to slew the engine to the target speed without involving vehicle system controller 14.

When the vehicle is accelerating, transmission 22 starts in first gear. When the engine has attained some sufficiently high speed, transmission 22 will shift from first gear to second gear. This gear shifting is accomplished by: disengaging engine 6 from transmission 22 by a clutch in a manual transmission and by a torque converter in an automatic transmission; rapidly decelerating engine 6 to the proper speed to match the wheel speed through the second gear; and re-engaging engine 6 with transmission 22.

The gear shifting process repeats in similar fashion for shifts to higher gears, such as second to third, third to fourth, etc. as the vehicle accelerates. A reverse process occurs for vehicle decelerations. As vehicle speed decreases, transmission 22 shifts to progressively lower gears and ultimately to first when the vehicle is stopped.

As mentioned earlier, the transmission shift quality during acceleration and deceleration depends on how fast the engine speed can be "slewed" from its prior speed to its new speed. This is particularly true for a manual transmission because the traction torque will be fully interrupted when the clutch is fully disengaged. In that case, starter/alternator 18 can be used to slew engine 6 so as to improve the shift quality.

In order to effectively use starter/alternator 8 to smooth out occasional transient conditions that arise during various driving situations, to smooth out the engine torque pulsation, and to slew the engine during transmission shifts, pertinent engine characteristics should be understood. Such characteristics include the average torque output as a function of speed, illustrated in FIG. 2, friction torque as a function of speed illustrated in FIG. 3 (which may also include temperature as a third dimension), and the compression load profile mentioned above. The graph plot of FIG. 2 is developed using known techniques which need not be discussed here. Starter/alternator 8 may be used to generate data from which a map of friction torque versus engine speed can be obtained. Starter/alternator 8 is operated to crank engine 6 at various speeds, without firing engine 6, and the average starter/alternator torque is recorded. A map of friction torque load versus crankshaft angle of rotation can be obtained by closely monitoring torque vs. the crankshaft position signal which, as mentioned earlier, is available to S/A controller 18. The information obtained is used to develop stored maps and profiles that are used to create make-up torque.

Control system 10A of FIG. 5 is a more extensive form of control system 10.

In a start-up mode, vehicle system controller 14 (VSC) issues an average torque command, $T^*_{S/Aavg}$, to S/A controller 18 to crank engine 6. Meanwhile, VSC 14 commands powertrain controller 16A to initialize fuel and ignition functions for starting engine 6.

In a drive mode, vehicle system controller 14 issues a traction torque command $T^*_{eng}$ to powertrain controller 16A. It also issues an average torque command, $T^*_{S/Aavg}$, to S/A controller 18. The average S/A torque is used to charge the battery (negative $T^*_{S/Aavg}$) or assist in vehicle traction effort (positive $T^*_{S/Aavg}$). S/A controller 18 will then superimpose on $T^*_{S/Aavg}$ a pulsating component, $DT^*_{S/A}$, intended to cancel the engine pulsating torque. This $DT^*_{S/A}$ is generated by the engine map stored in the S/A controller using the speed data from sensor 22, which provides both crankshaft speed and position in real time.

A distinctive operation within the drive mode is a transmission gear shift, described earlier.

In a standstill mode, where the HEV is not moving, vehicle system controller 14 issues commands to powertrain controller 16A and to S/A controller 18 either to stop engine 6 or to start engine 6 in order to keep in-vehicle accessory systems, such as the air conditioner for example, operational.

Rather than control system 10A having to repeatedly perform compensation torque computations and publish updated information on the moderate bandwidth data link, S/A controller 18 utilizes its stored maps to compute compensation torque values, $\Delta T^*_{S/A}$, immediately from engine speed data that is being continuously updated on the dedicated data communication link between sensor 22 and S/A controller 18. This capability is a significant contributor to improving the quality of HEV running, especially during accelerations and decelerations where the vehicle speed is changing quickly and the transmission needs to shift gears up and down.

The map derived from the graph plot of FIG. 3 can be utilized in an analogous manner, either by itself or cumulatively to a map derived from the graph plot of FIG. 2, to provide torque compensation for engine friction effects and the influence of engine temperature on engine friction. While the map of FIG. 3 is marked in terms of correlating engine friction to engine speed., the fact that engine friction influences engine torque in different ways at different engine speeds is believed well known to those familiar with internal combustion engines. The map derived from the graph plot of FIG. 3 is utilized during braking of the HEV when combustion within engine 6 is stopped by shutting off fuel to the engine to produce smoother deceleration over a range of speeds. Engine characteristics depicted in FIG. 3 are also useful during upshift when the engine needs to be slewed to a lower target speed for completing the shift.

One further aspect of using stored maps to create make-up torque concerns the use of the signal $T^*_{eng}$ in FIG. 1 as an input to S/A controller 18. A stored three-dimensional map that has engine speed and engine torque as respective independent dimensions may be used to create a make-up torque signal based on values of both of those variables.

From the foregoing description, the reader should appreciate that in its most comprehensive aspects, the invention contemplates the development of make-up torque from at least one variable, including variables that may not have been specifically mentioned earlier. While crankshaft motion data, meaning data relating to crankshaft position, speed, or acceleration, is supplied via the dedicated, high-speed data link between engine 6 and the S/A controller 18, controller 18 has at least one map that may utilize at least one further variable, like temperature, transmission gear, and control mode data for example, as a map input. Such inputs need not necessarily be supplied via the dedicated, high-speed data link.

While a presently preferred embodiment has been illustrated and described, it is to be appreciated that the invention may be practiced in various forms within the scope of the following claims.

We claim:

1. A hybrid electric vehicle comprising:
   a powerplant for propelling the vehicle comprising a combustion engine and a dynamoelectric machine that is arranged for interaction with the combustion engine so as to function, with respect to the engine, at times as a power source for adding torque into a drivetrain through which the powerplant propels the vehicle, and at times as a power sink for subtracting torque from the drivetrain;
   a control system comprising a vehicle controller that receives driver input and issues respective outputs to an engine controller for controlling the engine and to a dynamoelectric machine controller for controlling the dynamoelectric machine, respectively;
   a signal source on the engine providing engine speed data to said dynamoelectric machine controller;
   the dynamoelectric machine controller comprising a look-up table that contains respective make-up torque values correlated with respective values of engine speed data to smooth out vehicle acceleration and provide better drivability during certain driving condition; and
   the dynamoelectric machine controller comprising a processor that causes a make-up torque value from the look-up table corresponding to a value of engine speed data received from the signal source, to be included in the torque output of the dynamoelectric machine for interaction with the engine.

2. A hybrid electric vehicle as set forth in claim 1 in which the vehicle controller acts on the dynamoelectric machine controller to cause a make-up torque value from the look-up table corresponding to a value of engine speed data received from the signal source to be included in the torque output of the dynamoelectric machine in response to certain change in the driver input.

3. A hybrid electric vehicle as set forth in claim 2 in which the vehicle controller acts on the dynamoelectric machine controller to cause a make-up torque value from the look-up table corresponding to a value of engine speed data received from the signal source to be included in the torque output of the dynamoelectric machine in response to driver input commanding vehicle deceleration.

4. A hybrid electric vehicle as set forth in claim 3 in which the vehicle controller also acts on the engine controller to cause engine combustion to stop in response to driver input commanding vehicle deceleration.

5. A hybrid electric vehicle as set forth in claim 2 in which the vehicle controller acts on the dynamoelectric machine controller to cause a make-up torque value from the look-up table corresponding to a value of engine speed data received from the signal source to be included in the torque output of the dynamoelectric machine in response to driver input commanding vehicle acceleration.

6. A hybrid electric vehicle as set forth in claim 1 further comprising a dedicated data link that extends directly from the signal source to the dynamoelectric machine controller and has a bandwidth wider than that of a shared data communication link that is shared by the controllers.

7. A hybrid electric vehicle as set forth in claim 6 in which the hybrid electric vehicle further comprises a multi-gear transmission through which the powerplant delivers traction torque to driven wheels of the HEV, and which can be shifted out of one gear to a new gear, and in which initiation of a gear shift is effective to cause the dynamoelectric machine controller to slew the dynamoelectric machine to a new target speed appropriate for the new gear utilizing the engine speed data received from the signal source.

8. A hybrid electric vehicle as set forth in claim 1 in which the dynamoelectric machine comprises a starter/alternator that is capable of functioning as an electric starter motor to crank the engine when the engine is being started and as an electric generator that, when the engine is running under its own power, can be driven by the running engine to deliver electric energy useful to the hybrid electric vehicle.

9. A hybrid electric vehicle comprising:
a powerplant for propelling the vehicle comprising a combustion engine and a dynamoelectric machine;
a control system comprising a vehicle controller that receives driver input and issues respective outputs to an engine controller for controlling the engine and to a dynamoelectric machine controller for controlling the dynamoelectric machine, respectively;
a signal source on the engine providing engine speed data to said dynamoelectric machine controller;
the dynamoelectric machine controller comprising a look-up table that contains respective make-up torque values correlated with respective values of engine speed data; and
the dynamoelectric machine controller comprising a processor that causes a make-up torque value from the look-up table corresponding to a value of engine speed data received from the signal source, to be included in the torque output of the dynamoelectric machine;
wherein the signal source also provides position data for a crankshaft of the engine, the dynamoelectric machine controller further comprises a stored make-up torque profile correlated with crankshaft position for attenuating pulsations in engine torque output induced by changing pressures in combustion cylinders of the engine as the engine crankshaft rotates, and the processor of the dynamoelectric machine controller also causes make-up torque corresponding to the stored profile to also be included in the torque output of the dynamoelectric machine in attenuating relationship to pulsations in engine torque output induced by the changing pressures in the combustion cylinders of the engine as the engine crankshaft rotates.

10. A hybrid electric vehicle as set forth in claim 9 further comprising a dedicated data link that extends directly from the signal source to the dynamoelectric machine controller and has a bandwidth wider than that of a shared data communication link that is shared by the controllers.

11. A hybrid electric vehicle comprising:
a powerplant for propelling the vehicle comprising a combustion engine having a crankshaft and a dynamoelectric machine;
a control system comprising a vehicle controller that receives driver inputs and issues respective outputs to an engine controller for controlling the engine and to a dynamoelectric machine controller for controlling the dynamoelectric machine, respectively;
a signal source on the engine providing engine crankshaft position information to said dynamoelectric machine controller;
the dynamoelectric machine controller comprising a stored make-up torque profile correlated with crankshaft position for attenuating pulsations in engine torque output induced by changing pressures in combustion cylinders of the engine as the engine crankshaft rotates; and
the dynamoelectric machine controller comprising a processor that causes make-up torque corresponding to the stored profile to be included in the torque output of the dynamoelectric machine in attenuating relationship to pulsations in engine torque output induced by the changing pressures in the combustion cylinders of the engine as the engine crankshaft rotates.

12. A hybrid electric vehicle comprising:
a powerplant for propelling the vehicle comprising a combustion engine and a dynamoelectric machine that is arranged for interaction with the combustion engine so as to function, with respect to the engine, at times as a power source for adding torque into a drivetrain through which the powerplant propels the vehicle, and at times as a power sink for subtracting torque from the drivetrain;
a control system comprising a vehicle controller that receives driver input and issues respective outputs to an engine controller for controlling the engine and to a dynamoelectric machine controller for controlling the dynamoelectric machine, respectively;
a signal source on the engine providing data related to crankshaft motion, said data provided to said dynamoelectric machine controller;
the dynamoelectric machine controller comprising at least one look-up table for developing a respective make-up torque value correlated with the crankshaft motion data from the signal source and also with additional data for at least one other variable related to vehicle operation, wherein the additional data comprises one of engine cylinder compression, engine friction, and engine temperature; and
the dynamoelectric machine controller comprising a processor that causes a make-up torque value from the at least one look-up table to be included in the torque output of the dynamoelectric machine, for interaction with the engine, in accordance with the crankshaft motion data and the additional data for at least one other variable.

13. A method of operating a hybrid electric vehicle of the type comprising a powerplant for propelling the vehicle comprising a combustion engine having a crankshaft and a dynamoelectric machine that is arranged for interaction with the combustion engine so as to function, with respect to the engine, at times as a power source for adding torque into a drivetrain through which the powerplant propels the vehicle, and at times as a power sink for subtracting torque from the drivetrain; a control system comprising a vehicle controller that receives driver inputs and issues respective outputs to an engine controller for controlling the engine and to a dynamoelectric machine controller for controlling the dynamoelectric machine, respectively; the method comprising:
supplying engine speed data from a signal source on the engine to the dynamoelectric machine controller;
operating a processor of the dynamoelectric machine controller to look up make-up torque values that are stored in the dynamoelectric machine controller in correlation with respective values of engine speed data; and outputting from the processor make-up torque signals correlated to values of supplied engine speed data to create make-up current in the dynamoelectric machine that contributes to the torque output of the dynamoelectric machine for interaction with the engine in an amount corresponding to looked-up make-up torque.

14. A method of operating a hybrid electric vehicle of the type comprising a powerplant for propelling the vehicle comprising a combustion engine having a crankshaft and a dynamoelectric machine; a control system comprising a vehicle controller that receives driver inputs and issues respective outputs to an engine controller for controlling the engine and to a dynamoelectric machine controller for controlling the dynamoelectric machine, respectively; the method comprising:

supplying engine speed data from a signal source on the engine to the dynamoelectric machine controller;

operating a processor of the dynamoelectric machine controller to look up make-up torque values that are stored in the dynamoelectric machine controller in correlation with respective values of engine speed data; and outputting from the processor make-up torque signals correlated to values of supplied engine speed data to create make-up current in the dynamoelectric machine that contributes to the torque output of the dynamoelectric machine in an amount corresponding to looked-up make-up torque; and including a further step of supplying position data for a crankshaft of the engine to said dynamoelectric machine controller; and of operating the processor of the dynamoelectric machine controller to cause a make-up torque profile that is stored in the dynamoelectric machine controller and is correlated with engine crankshaft position for attenuating pulsations in engine torque output induced by changing pressures in combustion cylinders of the engine as the engine crankshaft rotates, to also be output by the processor as further make-up torque signals in attenuating relationship to pulsations in engine torque output induced by the changing pressures in the combustion cylinders of the engine as the engine crankshaft rotates to create further make-up current in the dynamoelectric machine that further contributes to the torque output of the dynamoelectric machine in correspondence with the profile.

\* \* \* \* \*